(12) United States Patent
Komiyama

(10) Patent No.: US 11,402,599 B2
(45) Date of Patent: Aug. 2, 2022

(54) LENS UNIT AND IMAGING DEVICE

(71) Applicant: NIDEC SANKYO CORPORATION, Nagano (JP)

(72) Inventor: Tadashi Komiyama, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 269 days.

(21) Appl. No.: 16/466,433

(22) PCT Filed: Dec. 5, 2017

(86) PCT No.: PCT/JP2017/043552
§ 371 (c)(1),
(2) Date: Jun. 4, 2019

(87) PCT Pub. No.: WO2018/105577
PCT Pub. Date: Jun. 14, 2018

(65) Prior Publication Data
US 2019/0310438 A1    Oct. 10, 2019

(30) Foreign Application Priority Data
Dec. 8, 2016    (JP) .............................. JP2016-238346

(51) Int. Cl.
*G02B 7/02* (2021.01)
*H04N 5/225* (2006.01)
(Continued)

(52) U.S. Cl.
CPC ............... *G02B 7/021* (2013.01); *G02B 3/00* (2013.01); *G02B 5/00* (2013.01); *G02B 7/02* (2013.01);
(Continued)

(58) Field of Classification Search
None
See application file for complete search history.

(56) References Cited

U.S. PATENT DOCUMENTS 9,459,432 B2 * 10/2016 Komiyama ............ G02B 13/18
9,720,203 B2 *  8/2017 Nakajima .............. G02B 7/028
(Continued)

FOREIGN PATENT DOCUMENTS

JP        05019104 A     1/1993
JP      2010164718 A     7/2010
(Continued)

OTHER PUBLICATIONS

International Search Report corresponding to Application No. PCT/JP2017/043552; dated Mar. 6, 2018.

*Primary Examiner* — Christopher Stanford
*Assistant Examiner* — Journey F Sumlar
(74) *Attorney, Agent, or Firm* — Cantor Colburn LLP

(57) ABSTRACT

A lens unit may include a plurality of lenses and a holder to hold the lenses. The lenses may include a cemented lens including a first lens and a second lens disposed on an image side with respect to the first lens. The first lens and the second lens may be joined by adhesive. The first lens may include a first lens face located on a side of the second lens and a first flange face. The second lens may include a second lens face located on a side of the first lens and a second flange face. The adhesive may be provided across a first boundary portion between the first lens face and the first flange face and across a second boundary portion between the second lens face and the second flange face. The second boundary portion may include one of a recessed part and a protruded part.

11 Claims, 4 Drawing Sheets

(51) Int. Cl.
  *G02B 3/00*    (2006.01)
  *G02B 13/04*   (2006.01)
  *G03B 11/00*   (2021.01)
  *G02B 5/00*    (2006.01)
  *G02B 13/18*   (2006.01)

(52) U.S. Cl.
  CPC ............ *G02B 13/04* (2013.01); *G02B 13/18* (2013.01); *G03B 11/00* (2013.01); *H04N 5/225* (2013.01); *H04N 5/2254* (2013.01)

(56) References Cited

U.S. PATENT DOCUMENTS

| | | | |
|---|---|---|---|
| 10,520,696 B2* | 12/2019 | Kanzaki | G02B 13/006 |
| 2011/0150459 A1* | 6/2011 | Chang | G02B 13/003 |
| | | | 396/529 |
| 2014/0118852 A1* | 5/2014 | Komiyama | G02B 27/021 |
| | | | 29/428 |
| 2017/0315426 A1* | 11/2017 | Ida | H04N 5/2253 |

FOREIGN PATENT DOCUMENTS

| | | | |
|---|---|---|---|
| JP | 2014119707 A | | 6/2014 |
| JP | 2017037155 A | | 2/2017 |

\* cited by examiner

LENS UNIT AND IMAGING DEVICE

CROSS REFERENCE TO RELATED APPLICATIONS

This is the U.S. national stage of application No. PCT/JP2017/043552, filed on Dec. 5, 2017. Priority under 35 U.S.C. § 119(a) and 35 U.S.C. § 365(b) is claimed from Japanese Application No. 2016-238346, filed Dec. 8, 2016; the disclosures of which are incorporated herein by reference.

TECHNICAL FIELD

At least an embodiment of the present invention relates to a lens unit in which a plurality of lenses are held by a tube-shaped holder and an imaging device.

BACKGROUND

In a lens unit in which a plurality of lenses are held by a tube-shaped holder, a cemented lens may be used for reducing aberration. Further, in a case that an imaging device is structured by using a lens unit, a light transmissive plate-shaped member such as an infrared filter is disposed in an end part on an image side of the holder. In order to manufacture a cemented lens, two lenses are respectively provided with a flange face surrounding a lens face and the lens faces and the flange faces are joined to each other by an adhesive. In this case, when the flange faces are contacted with each other only through flat face parts intersecting an axis around the lens faces, a large amount of the adhesive is flowed out to an outer peripheral side and thus, a technique has been proposed that a concave adhesive reservoir part is provided on an outer side in a radial direction with respect to the flat face of the flange face (see Patent Literature 1).

PATENT LITERATURE

[PTL 1] Japanese Patent Laid-Open No. 2014-119707

However, in a case that the flange faces are contacted with each other in the flat face parts intersecting an optical axis around the lens faces in the cemented lens, when an adhesive is not provided continuously in the flat face part and air is interposed, a light reflected toward an object side by a light transmissive plate-shaped member on an image side is reflected toward a particular direction on the image side at an interface of the flat face part and a ghost may be easily generated. The problem is difficult to be eliminated by the structure described in Patent Literature 1.

SUMMARY

In view of the problem described above, at least an embodiment of the present invention provides a lens unit and an imaging device which are capable of restraining reflection to a particular direction of a light which is incident on around a lens face of a cemented lens from an image side.

To solve the above-mentioned problem, at least an embodiment of the present invention provides a lens unit including a plurality of lenses and a holder in a tube shape which holds the plurality of the lenses. The plurality of the lenses includes a cemented lens configured so that a first lens and a second lens disposed on an image side with respect to the first lens are joined to each other with an adhesive. The first lens comprises a first lens face located on the second lens side and a first flange face surrounding the first lens face on an outer peripheral side, and the second lens comprises a second lens face located on the first lens side and a second flange face surrounding the second lens face on an outer peripheral side. The adhesive is provided from between the first lens face and the second lens face to between the first flange face and the second flange face across a first boundary portion between the first lens face and the first flange face and across a second boundary portion between the second lens face and the second flange face, and the second boundary portion is provided with one of a recessed part recessed toward the image side and a protruded part protruded toward an object side so as to be extended along the second boundary portion.

In at least an embodiment of the present invention, in a boundary portion (second boundary portion) between the second lens face and the second flange face of the second lens, the recessed part or the protruded part formed in the second lens is joined to the first lens with an adhesive and thus, a flat face part intersecting the optical axis does not exist in the boundary portion between the second lens face and the second flange face of the second lens. Therefore, in a case that the adhesive is provided in a discontinuous state and an air layer exists around the second lens face, even when a light is incident on around the second lens face from the image side, the light is incident on the portion where the recessed part or the protruded part is formed. Accordingly, even when a light is incident on around the second lens face from the image side, the light is reflected by the recessed part or the protruded part so as to be diffused and thus, the reflection to a particular direction can be restrained. As a result, occurrence of a ghost or the like caused by reflection around the lens face (around the first lens face and the second lens face) of the cemented lens can be restrained.

In at least an embodiment of the present invention, it may be structured that a bottom part of the recessed part or a tip end part of the protruded part formed in the second lens is formed to be a curved surface. According to this structure, even in a case that an air layer exists on the bottom part of the recessed part and on the tip end part of the protruded part, reflection such as diffusion is generated on the bottom part of the recessed part or on the tip end part of the protruded part and thus, occurrence of a ghost or the like can be restrained.

In at least an embodiment of the present invention, it may be structured that the cemented lens is a lens located on the most image side of the plurality of the lenses. According to this structure, in a case that a light transmissive plate-shaped member such as an infrared filter is disposed at an end part on the image side of the holder, even in a case that a light reflected toward the object side by the light transmissive plate-shaped member is incident on around the lens face of the cemented lens, reflection is generated around the lens face so as to be diffused. Therefore, occurrence of a ghost or the like caused by reflection around the lens face of the cemented lens can be restrained.

In at least an embodiment of the present invention, it may be structured that the second lens face is a convex-shaped lens face continuing from the recessed part or a concave-shaped lens face continuing from the protruded part. According to this structure, a shape of the second lens can be simplified and thus, the second lens is easily manufactured with a high degree of accuracy.

In at least an embodiment of the present invention, it may be structured that the second lens is a plastic lens. According to this structure, the recessed part or the protruded part may be formed at the time of molding the second lens and thus, in comparison with a case that the recessed part or the protruded part is provided in a glass lens, the recessed part or the protruded part is easily provided in the second lens.

In at least an embodiment of the present invention, it may be structured that at least a part of the recessed part or at least a part of the protruded part formed in the second lens is located on an inner side in a radial direction with respect to an edge of an image side opening part of the holder which is formed on the image side with respect to the cemented lens. According to this structure, the second lens face is located on an inner side of the image side opening part with a margin and thus, utilization efficiency of light can be enhanced.

In at least an embodiment of the present invention, it may be structured that the first boundary portion is provided with a protruded part to which the recessed part formed in the second lens is fitted or a recessed part to which the protruded part formed in the second lens is fitted so as to be extended along the first boundary portion. According to this structure, when the first lens and the second lens are to be joined to each other, an air layer is hard to be left in the first boundary portion of the first lens and in the second boundary portion of the second lens. Therefore, occurrence of a ghost or the like caused by reflection around the lens face of the cemented lens can be restrained. Further, the second boundary portion is provided with the recessed part which is recessed toward the image side so as to be extended in a circular ring shape along the second boundary portion, the first boundary portion is provided with the protruded part which is fitted to the recessed part formed in the second lens so as to be extended in a circular ring shape along the first boundary portion, and the protruded part is joined to an inner face of the recessed part with the adhesive.

In at least an embodiment of the present invention, it may be structured that, when a distance between the first lens face and the second lens face is defined as "Ga", a distance between a tip end part of the protruded part and a bottom part of the recessed part is defined as "Gb", and a distance between a portion of the first flange face adjacent to the protruded part and the recessed part on an outer side in a radial direction and a portion of the second flange face adjacent to the protruded part and the recessed part on the outer side in the radial direction is defined as "Gc", the distances "Ga", "Gb" and "Gc" satisfy the following relationship:

"Ga"<"Gb"<"Gc".

According to this structure, even when a burr is generated in split surfaces in a case that a face on the second lens side of the first lens and a face on the first lens side of the second lens are formed by split dies, the first lens 61 and the second lens 62 can be joined together appropriately.

In at least an embodiment of the present invention, it may be structured that one side flange face of the first flange face and the second flange face is provided with an adhesive reservoir part which is recessed to an opposite side to the other side flange face on an outer side in a radial direction with respect to the recessed part or the protruded part formed in the second lens. According to this structure, a situation that a large amount of the adhesive is flowed out to an outer side in the radial direction from between the first lens and the second lens. Therefore, a situation that the adhesive is provided in a discontinuous state between the first lens and the second lens is hard to be generated.

In at least an embodiment of the present invention, it may be structured that the one side flange face is formed with a flat face part intersecting an optical axis on the outer side in the radial direction with respect to the protruded part or the recessed part formed in the first lens and on an inner side in the radial direction with respect to the adhesive reservoir part. According to this structure, even if the adhesive shrinks when the adhesive is cured and, even if the adhesive is pulled toward the adhesive reservoir part from a region where the protruded part and the recessed part are formed, the adhesive is hard to be a discontinuous state. Therefore, a discontinuous state of the adhesive is hard to be generated around the lens face of the cemented lens.

In at least an embodiment of the present invention, it may be structured that the one side flange face and the other side flange face are provided with an abutting part in which flat faces intersecting an optical axis are contacted with each other on the outer side in the radial direction with respect to the adhesive reservoir part. According to this structure, the first lens and the second lens can be joined to each other appropriately.

In a case that the lens unit in accordance with at least an embodiment of the present invention is used in an imaging device, the imaging device includes a light transmissive plate-shaped member which is disposed on the image side with respect to the plurality of the lenses, and an image pickup element disposed on the image side with respect to the light transmissive plate-shaped member.

In at least an embodiment of the present invention, in a boundary portion (second boundary portion) between the second lens face and the second flange face of the second lens, the recessed part or the protruded part formed in the second lens is joined to the first lens with an adhesive and thus, a flat face part intersecting the optical axis does not exist in the boundary portion between the second lens face and the second flange face of the second lens. Therefore, in a case that the adhesive is provided in a discontinuous state and an air layer exists around the second lens face, even when a light is incident on around the second lens face from the image side, the light is incident on the portion where the recessed part or the protruded part is formed. Accordingly, even when a light is incident on around the second lens face from the image side, the light is reflected by the recessed part or the protruded part so as to be diffused and thus, the reflection to a particular direction can be restrained. As a result, occurrence of a ghost or the like caused by reflection around the lens face (around the first lens face and the second lens face) of the cemented lens can be restrained.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

Figure 1:
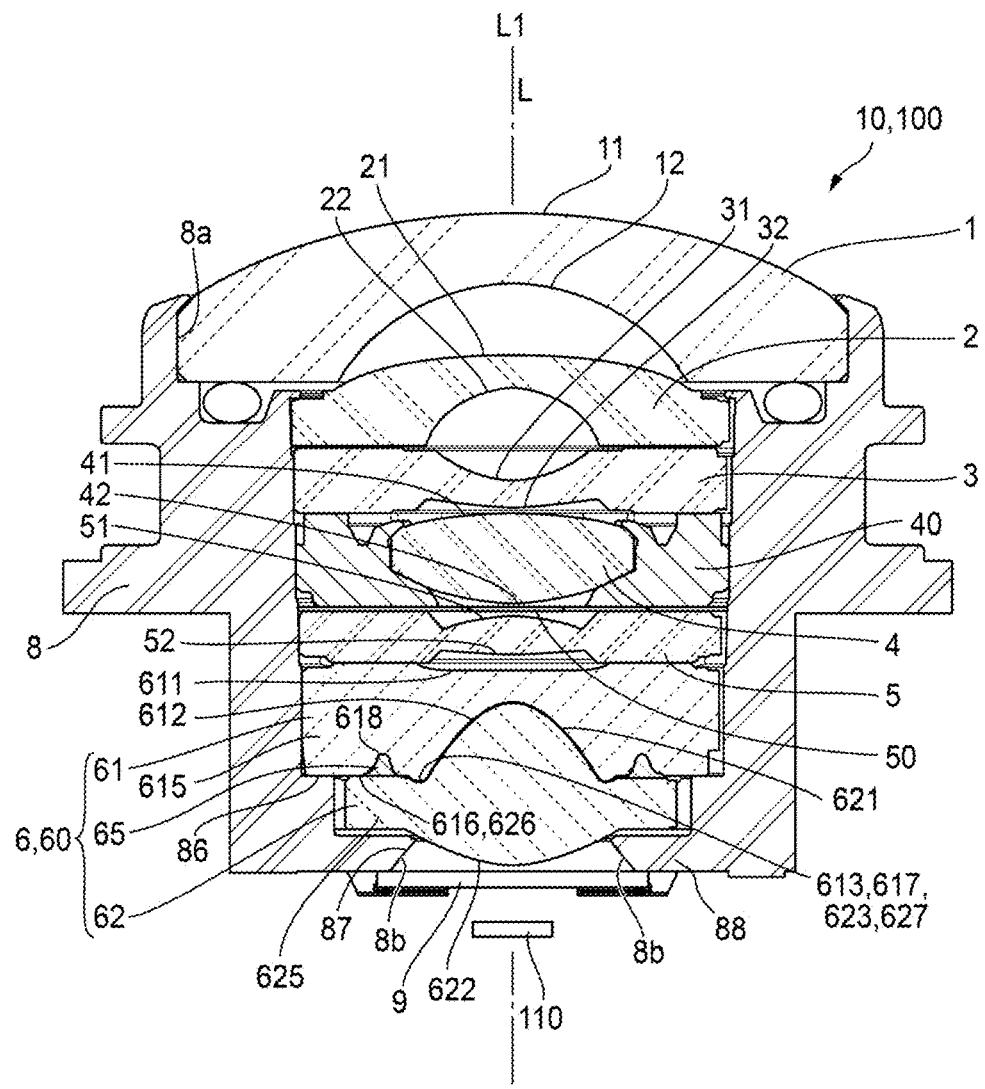
FIG. 1 is a cross-sectional view showing a lens unit and an imaging device to which at least an embodiment of the present invention is applied.

At least an embodiment of the present invention will be described below. In at least an embodiment of the present invention, in a first lens 61 and a second lens 62 which configure a cemented lens 60, the second lens 62 which is located on an image side "L2" is formed with a recessed part or a protruded part at a boundary portion (second boundary portion 623) between a lens face 621 (second lens face) and a second flange face 626 on an object side "L1". In an embodiment described below, a case will be mainly described that a recessed part 627 is formed at the second boundary portion 623 between the lens face 621 and the second flange face 626, and an embodiment in which a protruded part is formed will be described in other embodiments.

(Structure of Lens Unit)

FIG. 1 is a cross-sectional view showing a lens unit and an imaging device to which at least an embodiment of the present invention is applied. As shown in FIG. 1, a lens unit 10 in this embodiment includes a plurality of lenses 1, 2, 3, 4, 5 and 6 which are disposed along an optical axis "L" and a tube-shaped holder 8 which holds the plurality of lenses 1, 2, 3, 4, 5 and 6. In the plurality of the lenses 1, 2, 3, 4, 5 and 6, the lens 6 on the most image side "L2" is configured as a cemented lens 60. A diaphragm 50 is disposed between the lens 4 and the lens 5 on an inner side of the holder 8. The lens 4 is disposed on an inner side of the holder 8 in a state that the lens 4 is held by a tube-shaped member 40. In this embodiment, the lenses 2, 3 and 5 and the tube-shaped member 40 are held by an inner circumference of the holder 8 by press-fitting. In order to use the lens unit 10 in an imaging device 100, a light transmissive plate-shaped member 9 such as an infrared filter is disposed on the image side "L2" with respect to the plurality of the lenses 1, 2, 3, 4, 5 and 6, and an image pickup element 110 is disposed on the image side "L2" with respect to the light transmissive plate-shaped member 9. The light transmissive plate-shaped member 9 is fixed to an image side end part 88 of the holder 8. In this embodiment, the lens 1 located on the most object side "L1" is disposed so as to close an object side opening part 8a of the holder 8, and the light transmissive plate-shaped member 9 located on the most image side "L2" is disposed so as to close an image side opening part 8b of the holder 8. In the lens unit 10, the plurality of the lenses 1, 2, 3, 4, 5 and 6 is configured as a wide-angle lens whose view angle is 110° or more.

In this embodiment, the lens 1 is configured so that a lens face 11 on an object side "L1" is a convex curved surface and a lens face 12 on an image side "L2" is a concave curved surface. The lens 2 is configured so that a lens face 21 on the object side "L1" is a convex curved surface and a lens face 22 on the image side "L2" is a concave curved surface. The lens 3 is configured so that a lens face 31 on the object side "L1" is a concave curved surface and a lens face 32 on the image side "L2" is a convex curved surface. The lens 4 is configured so that both of a lens face 41 on the object side "L1" and a lens face 42 on the image side "L2" are convex curved surfaces. The lens 5 is configured so that both of a lens face 51 on the object side "L1" and a lens face 52 on the image side "L2" are convex curved surfaces.

(Configuration of Cemented Lens 60)

Figure 2:
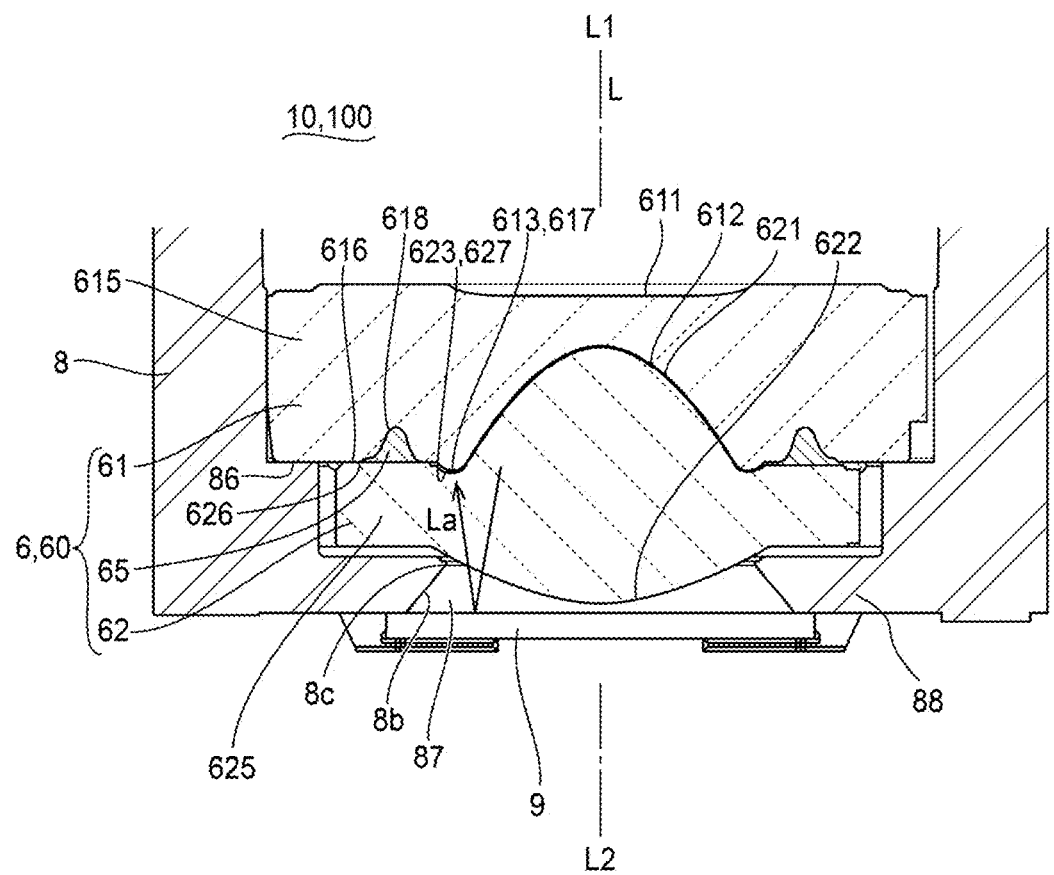
FIG. 2 is an enlarged cross-sectional view showing a cemented lens and the like of the lens unit shown in FIG. 1.

FIG. 2 is an enlarged cross-sectional view showing the cemented lens 60 and the like of the lens unit 10 shown in FIG. 1. As shown in FIG. 2, the lens 6 comprises the cemented lens 60 which has a positive power. The cemented lens 60 includes a first lens 61, a second lens 62 disposed on the image side "L2" with respect to the first lens 61, and an adhesive 65 for joining the first lens 61 to the second lens 62. In this embodiment, the adhesive 65 is a UV curable adhesive. The adhesive 65 is a material having elasticity after having been cured.

The first lens 61 is provided with a lens face 611 located on an opposite side (object side "L1") to the second lens 62, a lens face 612 (first lens face) located on the second lens 62 side (image side "L2"), and a first flange part 615 which surrounds the lens face 611 and the lens face 612 on an outer peripheral side. Therefore, the first lens 61 is provided with a first flange face 616 which surrounds the lens face 612 on an outer peripheral side. The lens face 611 is formed of a concave curved surface and the lens face 612 is formed of a concave curved surface. The second lens 62 is provided with a lens face 622 located on an opposite side (image side "L2") to the first lens 61, a lens face 621 (second lens face) located on the first lens 61 side (object side "L1"), and a second flange part 625 which surrounds the lens face 621 and the lens face 622 on an outer peripheral side. Therefore, the second lens 61 is provided with a second flange face 626 which surrounds the lens face 621 on an outer peripheral side. The lens face 621 is formed of a convex curved surface. The lens face 622 is formed of a convex curved surface. The lens face 621 has the same curvature radius and the like as those of the lens face 612 of the first lens 61. In this embodiment, each of the lens face 611, the lens face 612 (lens face 621) and the lens face 622 is an aspheric surface. Further, each of the first lens 61 and the second lens 62 is made of a plastic lens.

In order to join the first lens 61 to the second lens 62, the adhesive 65 is provided over the entire area between the first lens 61 and the second lens 62 including an area between the lens face 612 and the lens face 621 and an area between the first flange face 616 and the second flange face 626. Therefore, the adhesive 65 is provided from between the lens face 612 and the lens face 621 to between the first flange face 616 and the second flange face 626 across a boundary portion (first boundary portion 613) between the lens face 612 and the first flange face 616 and across a boundary portion (second boundary portion 623) between the lens face 621 and the second flange face 626.

In this embodiment, an outer diameter of the first lens 61 is larger than that of the second lens 62. Therefore, an outer peripheral portion of the first flange part 615 is projected to an outer side in the radial direction with respect to the second flange part 625. On the other hand, the holder 8 is formed with a step part 86 which supports an outer peripheral portion of the first flange part 615 projected to the outer side in the radial direction with respect to the second flange part 625 on the image side "L2". Further, an outer circumferential face of the first flange part 615 is held by an inner circumference of the holder 8 by press fitting. In addition, in the holder 8, a circular ring-shaped end plate part 87 is protruded to an inner side in the radial direction on the image side "L2" with respect to the step part 86. In this embodiment, an image side opening part 8b is formed in a center portion of the end plate part 87, and a light transmissive plate-shaped member 9 is fixed to an end face on the image side "L2" of the end plate part 87. A diameter of the image side opening part 8b is reduced toward the object side "L1" and its portion located on the most object side "L1" is a minimum opening portion 8c.

(Detailed Configuration of Cemented Lens 60)

Figure 3:
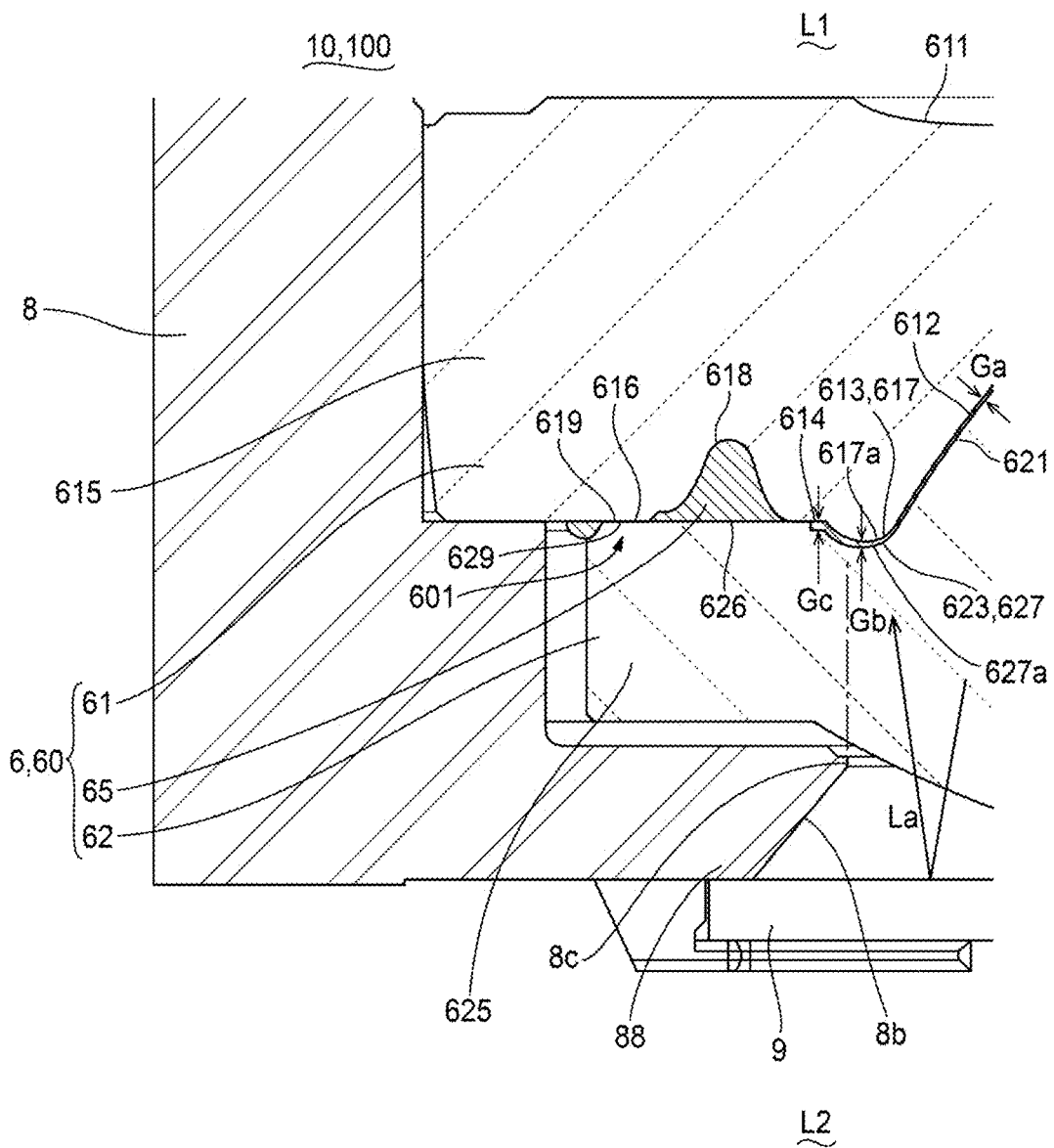
FIG. 3 is an enlarged cross-sectional view showing an end part of the cemented lens and the like shown in FIG. 2.
Figure 4:
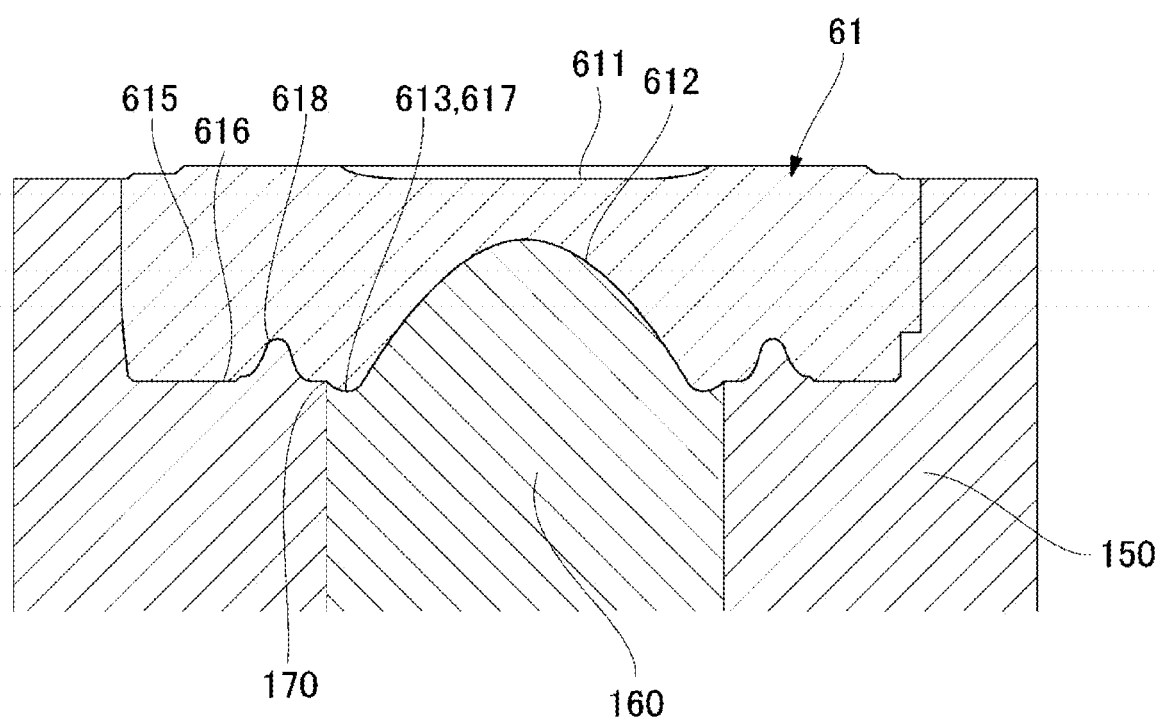
FIG. 4 is an explanatory view showing a manufacturing method of a first lens used in the cemented lens shown in FIG. 2.

FIG. 3 is an enlarged cross-sectional view showing an end part of the cemented lens 60 and the like shown in FIG. 2. FIG. 4 is an explanatory view showing a manufacturing method of the first lens 61 used in the cemented lens 60 shown in FIG. 2. As shown in FIG. 3, the first flange part 615 of the first lens 61 is provided on the image side "L2" with the first flange face 616 surrounding the lens face 612 on an outer peripheral side. The second flange part 625 of the second lens 62 is provided on the object side "L1" with the second flange face 626 surrounding the lens face 621 on an outer peripheral side.

In this embodiment, in the second boundary portion 623 which is a boundary between the second flange face 626 of the second lens 62 and the lens face 621, a recessed part 627 which is recessed toward an opposite side to the first lens 61 is extended in a circular ring shape along the second boundary portion 623. On the other hand, in the first boundary portion 613 between the first flange face 616 of the first lens 61 and the lens face 612, a protruded part 617 which is protruded toward the second lens 62 side is extended in a circular ring shape along the first boundary portion 613. Therefore, the protruded part 617 of the first lens 61 is fitted to an inner side of the recessed part 627 of the second lens 62 and is joined to an inner face of the recessed part 627 by the adhesive 65.

The recessed part 627 has a circular arc shape in cross section. Therefore, a bottom part 627a of the recessed part 627 is formed to be a concave curved face, and a diameter of the recessed part 627 is enlarged from the bottom part 627a toward an opening edge. Similarly to the recessed part 627, the protruded part 617 also has a circular arc shape in cross section. Therefore, a tip end part 617a of the protruded part 617 is formed to be a convex curved face, and a diameter of the protruded part 617 is enlarged from the tip end part 617a toward its root part. In this embodiment, an effective diameter of the lens face 612 of the first lens 61 is located on an inner side in the radial direction with respect to an edge of the minimum opening portion 8c of the image side opening part 8b of the holder 8. Further, an effective diameter of the lens face 621 of the second lens 62 is located on an inner side in the radial direction with respect to the edge of the minimum opening portion 8c of the image side opening part 8b of the holder 8. Therefore, at least a part of the protruded part 617 and at least a part of the recessed part 627 are located on an inner side in the radial direction with respect to the edge of the minimum opening portion 8c located on the most object side "L1" in the image side opening part 8b of the holder 8, which is formed on the image side "L2" with respect to the cemented lens 60. In other words, the first boundary portion 613 of the first lens 61 is located on an outer peripheral side with respect to the effective diameter of the lens face 612 and thus, at least a part of the protruded part 617 is located on an inner side in the radial direction with respect to the edge of the minimum opening portion 8c of the image side opening part 8b. Further, the second boundary portion 623 of the second lens 62 is located on an outer peripheral side with respect to the effective diameter of the lens face 621 and thus, at least a part of the recessed part 627 is located on an inner side in the radial direction with respect to the edge of the minimum opening portion 8c of the image side opening part 8b.

In this embodiment, in the first flange face 616 and the second flange face 626, one side flange face is provided with an adhesive reservoir part 618 which is recessed toward an opposite side to the other side flange face on an outer side in the radial direction with respect to the protruded part 617 and the recessed part 627. In this embodiment, the adhesive reservoir part 618 which is recessed to an opposite side to the second flange face 626 is provided on a side of the first flange face 616 on an outer side in the radial direction with respect to the protruded part 617 and the recessed part 627. Further, the first flange face 616 is formed with a flat face part 614 intersecting the optical axis "L" on an outer side in the radial direction with respect to the protruded part 617 and the recessed part 627 and on an inner side in the radial direction with respect to the adhesive reservoir part 618. Further, in the first flange face 616 and the second flange face 626, an abutting part 601 where the flat faces 619 and 629 intersecting the optical axis "L" are contacted with each other is provided on an outer side in the radial direction with respect to the adhesive reservoir part 618.

In this embodiment, when the first lens 61 and the second lens 62 are to be joined to each other, for example, an adhesive 65 is applied to a side of the lens face 612 of the first lens 61 and then, the first lens 61 and the second lens 62 are overlapped with each other. As a result, the adhesive 65 is spread between the first lens 61 and the second lens 62 and thus, after that, when the adhesive 65 is cured, the first lens 61 and the second lens 62 are joined to each other by the adhesive 65. In the joining step, when the adhesive 65 is to be spread over between the first lens 61 and the second lens 62, the adhesive 65 is going to flow out from between the first lens 61 and the second lens 62 to an outer side, but the adhesive 65 is collected in the adhesive reservoir part 618. Therefore, an amount of the adhesive 65 flowed out from between the first lens 61 and the second lens 62 to an outer side can be reduced and thus, a discontinuous portion of the adhesive 65 is hard to be generated between the first lens 61 and the second lens 62. Further, the flat faces 619 and 629 of the first lens 61 and the second lens 62 are contacted with each other and thus, a distance between the first lens 61 and the second lens 62 can be controlled in an appropriate dimension. Therefore, a discontinuous portion of the adhesive 65 is hard to be generated between the first lens 61 and the second lens 62.

Further, in the cemented lens 60, when a distance between the lens face 612 and the lens face 621 is defined as "Ga", a distance between the tip end part 617a of the protruded part 617 and the bottom part 627a of the recessed part 627 is defined as "Gb", and a distance between a portion of the first flange face 616 adjacent to the protruded part 617 on an outer side in the radial direction and a portion of the second flange face 626 adjacent to the recessed part 627 on an outer side in the radial direction is defined as "Gc", the distances "Ga", "Gb" and "Gc" satisfy the following relationship:

"Ga"<"Gb"<"Gc".

In this embodiment, the "Ga" is in a range from several μm to about 10 μm, the "Gb" is in a range from ten and several m to about 20 μm, and the "Gc" is in a range from twenty and several m to about 30 μm.

Therefore, as shown in FIG. 4, in a case that a face on the second lens 62 side of the first lens 61 is formed by split dies which are provided with a first die 150 in a cylindrical tube shape and a second die 160 (insert die) disposed on an inner side of the first die 150, even when a burr is generated, the first lens 61 and the second lens 62 can be joined together appropriately. In other words, in a case that split surfaces 170 of the first die 150 and the second die 160 are located in a portion of the first flange face 616 adjacent to the protruded part 617 on an outer side in the radial direction, although a burr is generated in a portion corresponding to the split surfaces 170, the burr is generated in a portion where a distance between the first lens 61 and the second lens 62 is wide. Therefore, even when a burr is generated, the first lens 61 and the second lens 62 can be joined together appropriately. Similarly, even when a burr is generated in a case that a face on the first lens 61 side of the second lens 62 is formed by split dies which are provided with a first die 150 in a cylindrical tube shape and a second die 160 (insert die) disposed on an inner side of the first die 150, the first lens 61 and the second lens 62 can be joined together appropriately. In other words, in a case that split surfaces 170 of the first die 150 and the second die 160 are located in a portion of the second flange face 626 adjacent to the recessed part 627 on an outer side in the radial direction, although a burr is generated in a portion corresponding to the split surfaces 170, the burr is generated in a portion where a distance between the first lens 61 and the second lens 62 is wide. Therefore, even when a burr is generated, the first lens 61 and the second lens 62 can be joined together appropriately.

(Principal Effects in this Embodiment)

As described above, in the cemented lens 60 in this embodiment, in the second boundary portion 623 between the lens face 621 of the second lens 62 and the second flange face 626 on the image side "L2", the recessed part 627 formed in the second lens 62 is joined to the first lens 61 by the adhesive 65 and thus, a flat face part intersecting the optical axis "L" does not exist in a boundary portion between the lens face 621 of the second lens 62 and the second flange face 626. Therefore, in a case that the adhesive 65 is not provided in a continuous state and an air layer exists at a portion around the lens face 621, even when a light is incident on around the lens face 621 from the image side "L2", the light is incident on the portion where the recessed part 627 is formed. Accordingly, even when a light is incident on around the lens face 621 from the image side "L2", the light is reflected by the recessed part 627 so as to be diffused and thus, the reflection to a particular direction can be restrained. As a result, occurrence of a ghost or the like caused by reflection around the lens face (around the lens face 612 and the lens face 621) of the cemented lens 60 can be restrained.

For example, the cemented lens 60 is the lens 6 on the most image side "L2". Therefore, as shown in FIGS. 2 and 3, even in a case that a light reflected toward the object side "L1" by the light transmissive plate-shaped member 9 is incident on around the lens faces 612 and 621 of the cemented lens 60, reflection is generated around the lens faces 612 and 621 so as to be diffused. Therefore, occurrence of a ghost or the like caused by reflection around the lens faces 612 and 621 of the cemented lens 60 can be restrained. Accordingly, the protruded part 617 and the recessed part 627 can be located on an inner side in the radial direction with respect to the edge of the image side opening part 8b of the holder 8 which is formed on the image side "L2" with respect to the cemented lens 60. As a result, the lens faces 612 and 621 are located on an inner side of the image side opening part 8b with a margin and thus, utilization efficiency of light can be enhanced.

Further, in the first lens 61 on the object side "L1", the first boundary portion 613 between the lens face 612 and the first flange face 616 is formed with the protruded part 617 which is fitted to the recessed part 627 of the second lens 62, and the protruded part 617 is joined to the recessed part 627 by the adhesive 65. Therefore, when the first lens 61 and the second lens 62 are to be joined to each other, an air layer is hard to be left in the first boundary portion 613 of the first lens 61 and in the second boundary portion 623 of the second lens 62. Accordingly, occurrence of a ghost or the like caused by reflection around the lens face (around the lens face 612 and the lens face 621) of the cemented lens 60 can be restrained.

Further, the bottom part 627a of the recessed part 627 is formed to be a concave curved face, and the tip end part 617a of the protruded part 617 is formed to be a convex curved face. Therefore, even in a case that an air layer exists on the tip end part 617a of the protruded part 617 and on the bottom part 627a of the recessed part 627, reflection such as diffusion is generated on the tip end part 617a of the protruded part 617 and on the bottom part 627a of the recessed part 627 and thus, occurrence of a ghost or the like can be restrained.

Further, the protruded part 617 is formed in a face on the image side "L2" of the first lens 61 which is formed with the concave-shaped lens face 612, and the recessed part 627 is formed in a face on the object side "L1" of the second lens 62 which is formed with the convex-shaped lens face 621. Therefore, a face shape on the image side "L2" of the first lens 61 and a face shape on the object side "L1" of the second lens 62 can be simplified. Accordingly, the first lens 61 and the second lens 62 are easily manufactured with a high degree of accuracy.

Further, each of the first lens 61 and the second lens 62 is a plastic lens and thus, the protruded part 617 and the recessed part 627 may be formed at the time of molding of the first lens 61 and the second lens 62. Therefore, in comparison with a case that the protruded part 617 or the recessed part 627 is provided in a glass lens, the protruded part 617 and the recessed part 627 are easily provided in the first lens 61 and the second lens 62.

Further, the first flange face 616 is formed with the flat face part 614 intersecting the optical axis "L" on an outer side in the radial direction with respect to the protruded part 617 and the recessed part 627 and on an inner side in the radial direction with respect to the adhesive reservoir part 618. Therefore, even if the adhesive 65 shrinks when the adhesive 65 is cured and, even if the adhesive 65 is pulled toward the adhesive reservoir part 618 from between the protruded part 617 and the recessed part 627, a discontinuous portion of the adhesive 65 is hard to be generated. Accordingly, a discontinuous portion (air layer) of the adhesive 65 is hard to be generated between the protruded part 617 and the recessed part 627 and thus, a reflection interface is hard to be generated around the lens faces 612 and 621.

Other Embodiments

In the embodiment described above, the recessed part 627 is formed in a boundary portion (second boundary portion 623) between the lens face 621 of the second lens 62 and the second flange face 626. However, instead of the recessed part 627, a protruded part protruded to the first lens 61 side may be provided. In this case, a boundary portion (first boundary portion) between the lens face 612 of the first lens 61 and the first flange face 616 is formed with a recessed part to which the protruded part of the second lens 62 is fitted, and that the protruded part of the second lens 62 is joined to an inner circumferential surface of the recessed part of the first lens by an adhesive 65. Also in this case, it a tip end part of the protruded part and a bottom part of the recessed part are formed to be a curved surface. Further, the lens face 621 of the second lens 62 is a concave curved face continuing to the protruded part, and that the lens face 612 of the first lens 61 is a convex curved face continuing to the recessed part.

In the embodiment described above, a lens configuration of seven lenses in six groups is described, but at least an embodiment of the present invention may be applied to a lens unit having any lens configuration, for example, six lenses in five groups. Further, in the embodiment described above, one cemented lens 60 is provided, but at least an embodiment of the present invention may be applied to a lens unit comprising a plurality of cemented lenses.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

The invention claimed is:

1. A lens unit comprising:
a plurality of lenses which are disposed along an optical axis; and
a holder structured to hold the plurality of the lenses;
wherein the plurality of the lenses comprises a cemented lens comprising:
a first lens; and
a second lens disposed on an image side with respect to the first lens; wherein the first lens and the second lens are joined to each other with an adhesive;
wherein the first lens comprises a first lens face located on a side of the second lens and a first flange face located on the side of the second lens and formed in a flat face substantially perpendicular to the optical axis so as to surround the first lens face on an outer peripheral side;
wherein the second lens comprises a second lens face located on a side of the first lens and a second flange face located on the side of the first lens and formed in a flat face substantially perpendicular to the optical axis so as to surround the second lens face on an outer peripheral side;
wherein the adhesive is provided from between the first lens face and the second lens face to between the first flange face and the second flange face across a first boundary portion located between the first lens face and the first flange face and across a second boundary portion located between the second lens face and the second flange face;
wherein the second boundary portion comprises one of a recessed part recessed from the second flange face toward the image side and a protruded part protruded from the second flange face toward an object side between the second lens face and the second flange face so as to be extended along the second boundary portion;
wherein the first boundary portion comprises a protruded part, which is protruded from the first flange face toward the image side and is entered and fitted into the recessed part formed in the second boundary portion of the second lens, or a recessed part which is recessed from the first flange face toward the object side and into which the protruded part formed in the second boundary portion of the second lens is entered and fitted, between the first lens face and the first flange face so as to be extended along the first boundary portion; and
wherein when a distance between the first lens face and the second lens face is defined as "Ga", a distance in a direction of the optical axis between a tip end part of the protruded part and a bottom part of the recessed part into which the protruded part is entered is defined as "Gb", and a distance in the direction of the optical axis between a flat portion on an inner side with respect to the first flange face which is adjacent to the protruded part and the recessed part on an outer side in a radial direction and a flat portion on an inner side with respect to the second flange face which is adjacent to the protruded part and the recessed part on the outer side in the radial direction is defined as "Gc", the distances "Ga", "Gb" and "Gc" satisfy a following relationship:

"Ga"<"Gb"<"Gc".

2. The lens unit according to claim 1, wherein a bottom part of the recessed part or a tip end part of the protruded part formed in the second lens is formed to be a curved surface.

3. The lens unit according to claim 1, wherein the cemented lens is a lens located on a most image side of the plurality of the lenses.

4. The lens unit according to claim 1, wherein the second lens face is a convex-shaped lens face continuing from the recessed part or a concave-shaped lens face continuing from the protruded part.

5. The lens unit according to claim 1, wherein the second lens is a plastic lens.

6. The lens unit according to claim 1, wherein at least a part of the recessed part or at least a part of the protruded part formed in the second lens is located on an inner side in a radial direction with respect to an edge of an image side opening part of the holder which is formed on the image side with respect to the cemented lens.

7. The lens unit according to claim 1, wherein one side flange face of the first flange face and the second flange face comprises an adhesive reservoir part which is recessed to an opposite side to an other side flange face on an outer side in a radial direction with respect to the recessed part or the protruded part formed in the second lens.

8. The lens unit according to claim 7, wherein the one side flange face comprises a flat face part intersecting an optical axis on the outer side in the radial direction with respect to the protruded part or the recessed part formed in the first lens and on an inner side in the radial direction with respect to the adhesive reservoir part.

9. The lens unit according to claim 7, wherein the one side flange face and the other side flange face comprises an abutting part in which flat faces intersecting an optical axis are contacted with each other on the outer side in the radial direction with respect to the adhesive reservoir part.

10. The lens unit according to claim 1, wherein
the second boundary portion comprises the recessed part which is recessed toward the image side so as to be extended in a circular ring shape along the second boundary portion,
the first boundary portion comprises a protruded part which is fitted to the recessed part formed in the second lens so as to be extended in a circular ring shape along the first boundary portion, and
the protruded part is joined to an inner face of the recessed part with the adhesive.

11. An imaging device comprising the lens unit defined in claim 1, the imaging device comprising:
a light transmissive plate-shaped member which is disposed on the image side with respect to the plurality of the lenses; and
an image pickup element which is disposed on the image side with respect to the light transmissive plate-shaped member.

* * * * *